A. J. MINOR.
DRAFT DEVICE FOR PLOWS.
APPLICATION FILED MAR. 2, 1908.
898,764.
Patented Sept. 15, 1908.
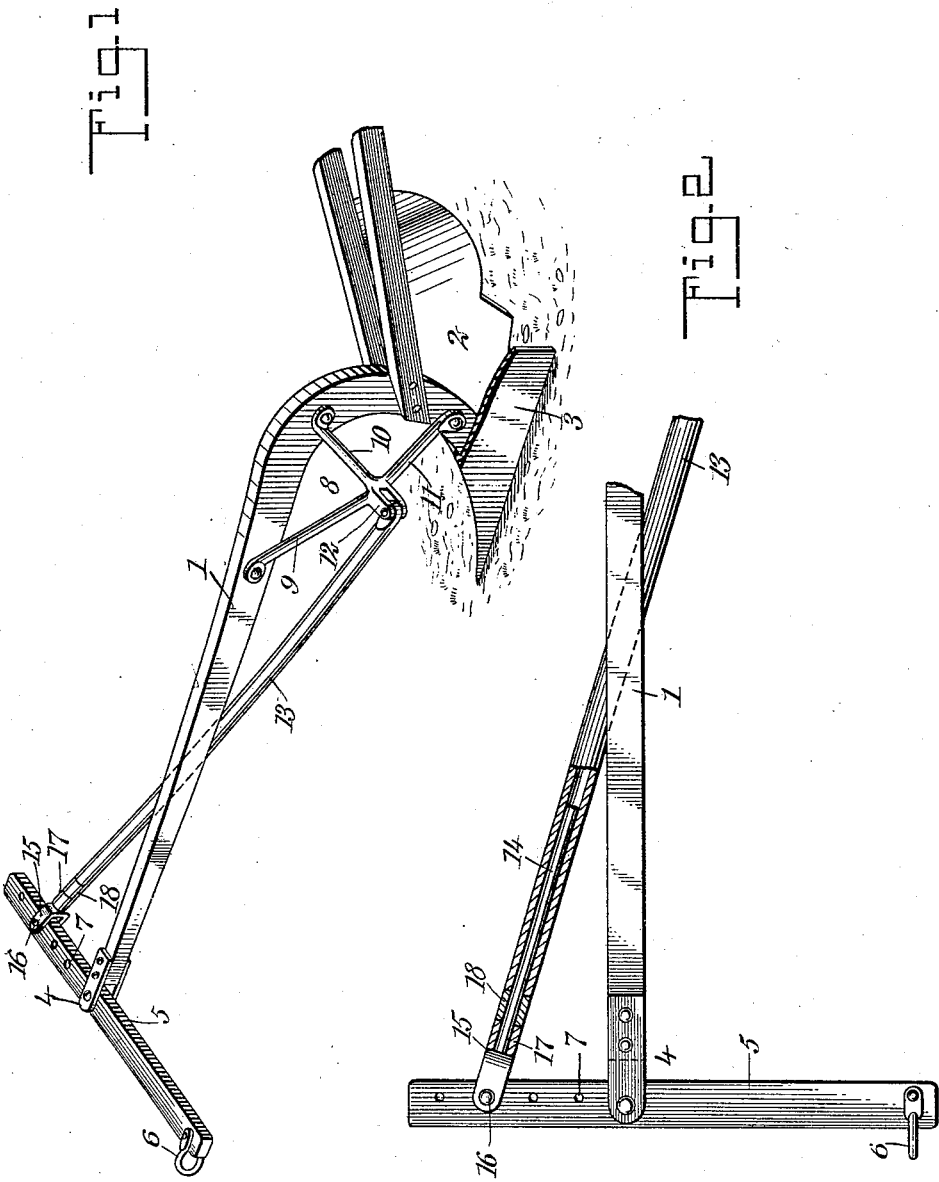
WITNESSES
J. A. Brophy
F. D. Ammen
INVENTOR
Albert J. Minor
BY Munn & Co
ATTORNEYS

UNITED STATES PATENT OFFICE.

ALBERT J. MINOR, OF CANTON, SOUTH DAKOTA.

DRAFT DEVICE FOR PLOWS.

No. 898,764.  Specification of Letters Patent.  Patented Sept. 15, 1908.

Application filed March 2, 1908. Serial No. 418,674.

*To all whom it may concern:*

Be it known that I, ALBERT J. MINOR, a citizen of the United States, and a resident of Canton, in the county of Lincoln and State of South Dakota, have invented a new and Improved Draft Device for Plows, of which the following is a full, clear, and exact description.

This invention relates to draft devices, and especially to such devices when used for drawing plows.

More specifically, the invention relates to draft mechanism of this kind which is constructed in such a manner as to enable the draft animals to be hitched to the plow out of alinement with the plowshare, a construction being provided which tends to prevent what is known as the side draft. By preventing this side draft, the plow will continue in a straight line although the pulling force is applied at a laterally displaced point.

The object of the invention is to provide a draft mechanism of this character having an improved construction which facilitates the adjustment of the device to suit the pulling force.

The invention consists in the construction and combination of parts to be more fully described hereinafter and particularly set forth in the claims.

Reference is to be had to the accompanying drawings forming a part of this specification, in which similar characters of reference indicate corresponding parts in both figures.

Figure 1 is a perspective of a plow showing my invention, a portion of the land side of the plow being broken away as indicated; and Fig. 2 is a plan of the forward portion of the plow, certain parts being broken away and shown in cross section.

Referring more particularly to the parts, 1 represents the plow beam, the body of which is horizontal as shown, the rear portion of the beam being bent downwardly, and provided with a plowshare 2 having its land side 3 disposed on the left as indicated. At the forward end of the beam 1 a bracket 4 is formed, and in this bracket the evener or equalizer 5 is pivotally attached. This evener is attached near its middle point, and the arm which projects toward the left is provided near its end with a shackle 6 to which the draft animals are attached. The oppositely projecting arm is provided with a plurality of openings 7 as indicated.

At the left side of the beam 1 near the plowshare 2, a bracket or spider 8 is rigidly attached, the said spider comprising three arms 9, 10 and 11, which are rigidly attached to the sides of the beam. At the point of junction of the arms 9, 10 and 11, a fork or shackle 12 is formed, in which there is pivotally attached the extremity of a diagonally disposed push bar or strut 13. This strut is disposed in an inclined direction, as shown, passing under the beam 1 to the right of the plow at its forward end. The forward end of this push bar or strut 13 is of tubular form, as indicated in Fig. 2, so as to receive a telescoping stem 14, which stem is rigidly mounted on a fork 15, which is pivotally attached by means of a removable bolt 16 in any of the openings 7. The fork 15 is formed with a hub 17, but this hub does not seat directly upon the end of the strut 13, but seats upon an intermediate removable sleeve 18. In practice, I shall provide a number of these sleeves 18 of different lengths, corresponding to different positions of the strut 13; that is, there will be a sleeve corresponding to the position of the strut when the bolt 16 is in the outermost hole; likewise, there will be similar sleeves of the proper length to suit the position of the strut when the bolt 16 is in either of the two innermost holes 7. In this way, for different positions of the strut 13, the strut will operate to hold the evener in a transversely disposed position; that is, substantially at right angles to the beam 1.

Attention is called to the fact that the stem 14 is not secured to the strut 13, but it slides freely within the same. This enables it to be readily withdrawn for changing the sleeve 18 in the manner suggested.

It should be understood that when the pulling force is applied to the shackle 6, a rearwardly acting force manifests itself in the strut 13, and this force tends to overcome the side draft of the plow which would tend to move it to one side. By adjusting the fork 15 at the evener, the leverage of this force of the strut 13 may be changed so as to suit different pulling forces exerted at the shackle 6.

Having thus described my invention, I claim as new and desire to secure by Letters Patent:

1. A plow comprising a beam, an evener pivotally attached to the forward end thereof and extending transversely of said beam, said evener having an arm projecting toward the left and an arm projecting toward the right, means for attaching draft animals to one of said arms, a strut crossing said beam in a diagonal direction, means for pivotally mounting the rear end of said strut near the rear end of said beam, a member telescoping with said strut at the forward end thereof, means for pivotally attaching said member to said evener in a plurality of different positions, and a removable member between said member and the end of said strut and against which said first member seats.

2. A plow comprising a beam, an evener pivotally attached to the forward end of said beam, with an arm extending toward the left and an arm extending toward the right, one of said arms having a plurality of openings therein, a strut extending diagonally with respect to said beam, means for pivotally mounting said strut near the rear end of said beam, a fork pivotally attached to said evener in one of said openings and having a stem telescoping with said strut, and a removable sleeve disposed around said stem and between said fork and the end of said strut.

In testimony whereof I have signed my name to this specification in the presence of two subscribing witnesses.

ALBERT J. MINOR

Witnesses:
 HENRY N. COOPER,
 ELI BOHEN.